Jan. 21, 1941.  H. P. VAN KEUREN  2,229,263
HAND TOOL
Filed June 26, 1937   5 Sheets-Sheet 1

INVENTOR.
Henry Van Keuren

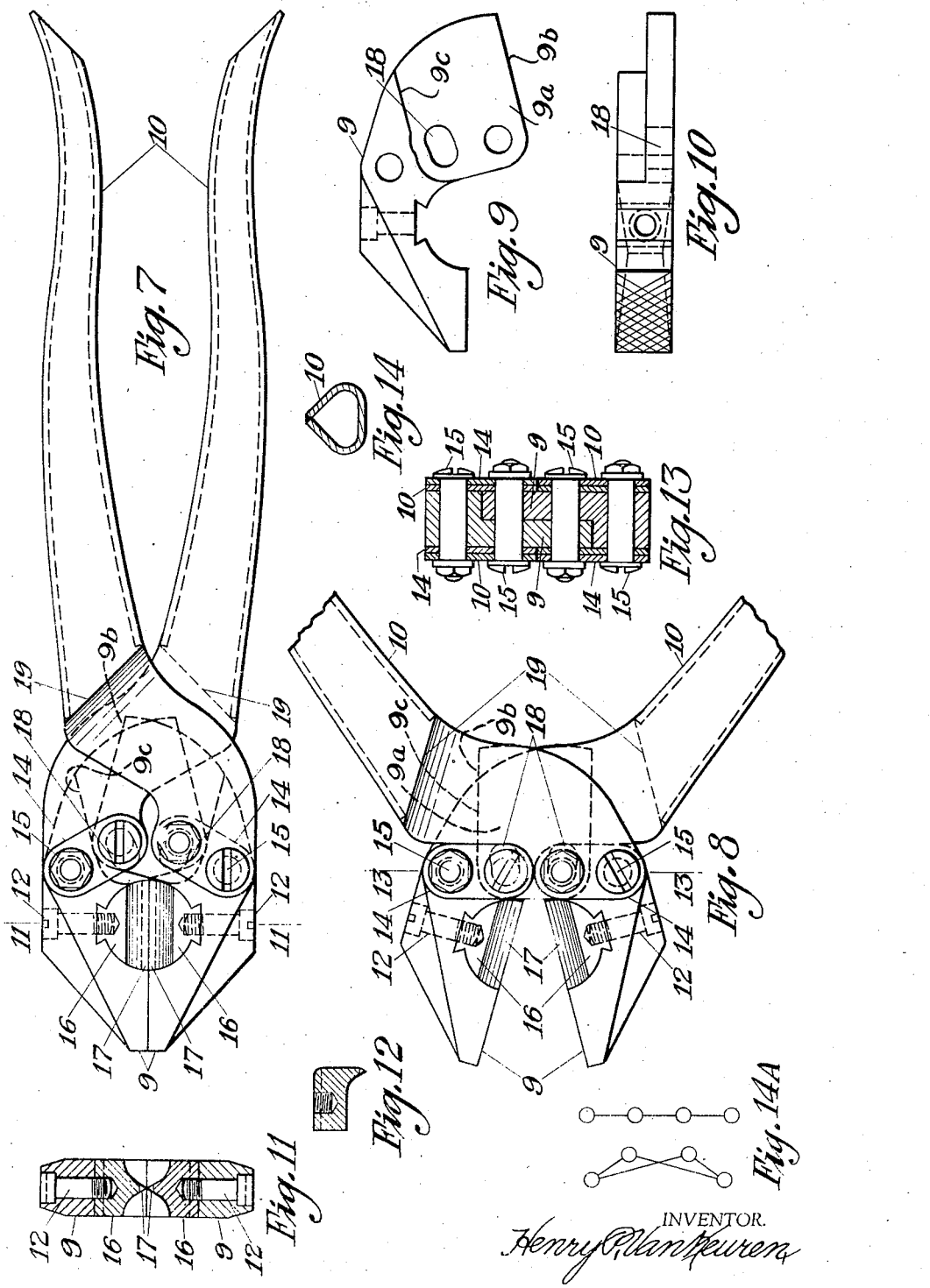

Jan. 21, 1941. H. P. VAN KEUREN 2,229,263
HAND TOOL
Filed June 26, 1937 5 Sheets-Sheet 3

INVENTOR.
Henry P. Van Keuren

Jan. 21, 1941.         H. P. VAN KEUREN         2,229,263
HAND TOOL
Filed June 26, 1937          5 Sheets-Sheet 4
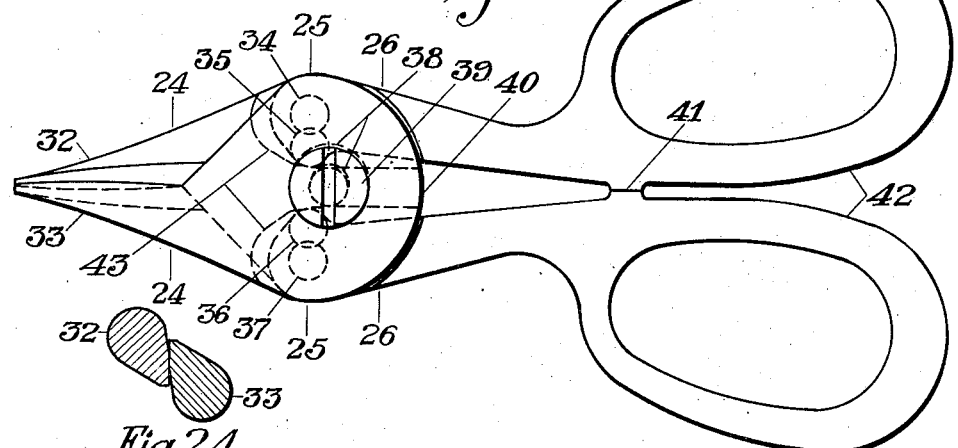
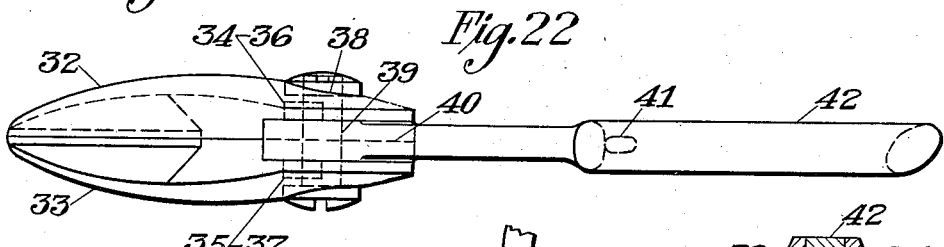
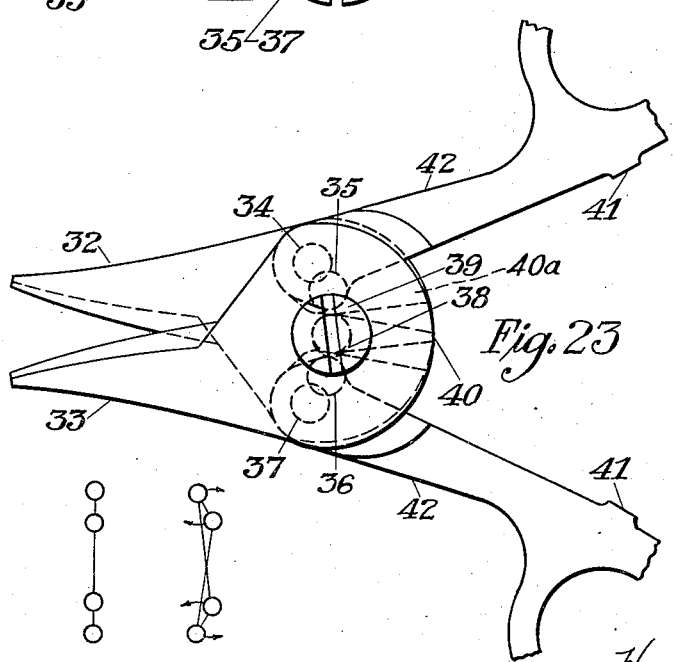
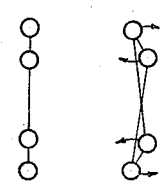
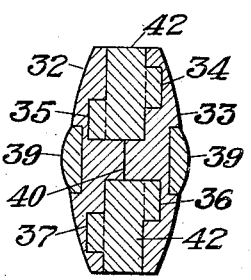
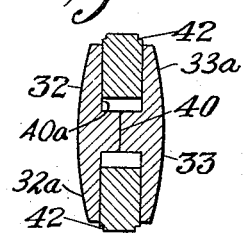
INVENTOR.
Henry P. Van Keuren Jan. 21, 1941.   H. P. VAN KEUREN   2,229,263
HAND TOOL
Filed June 26, 1937   5 Sheets-Sheet 5
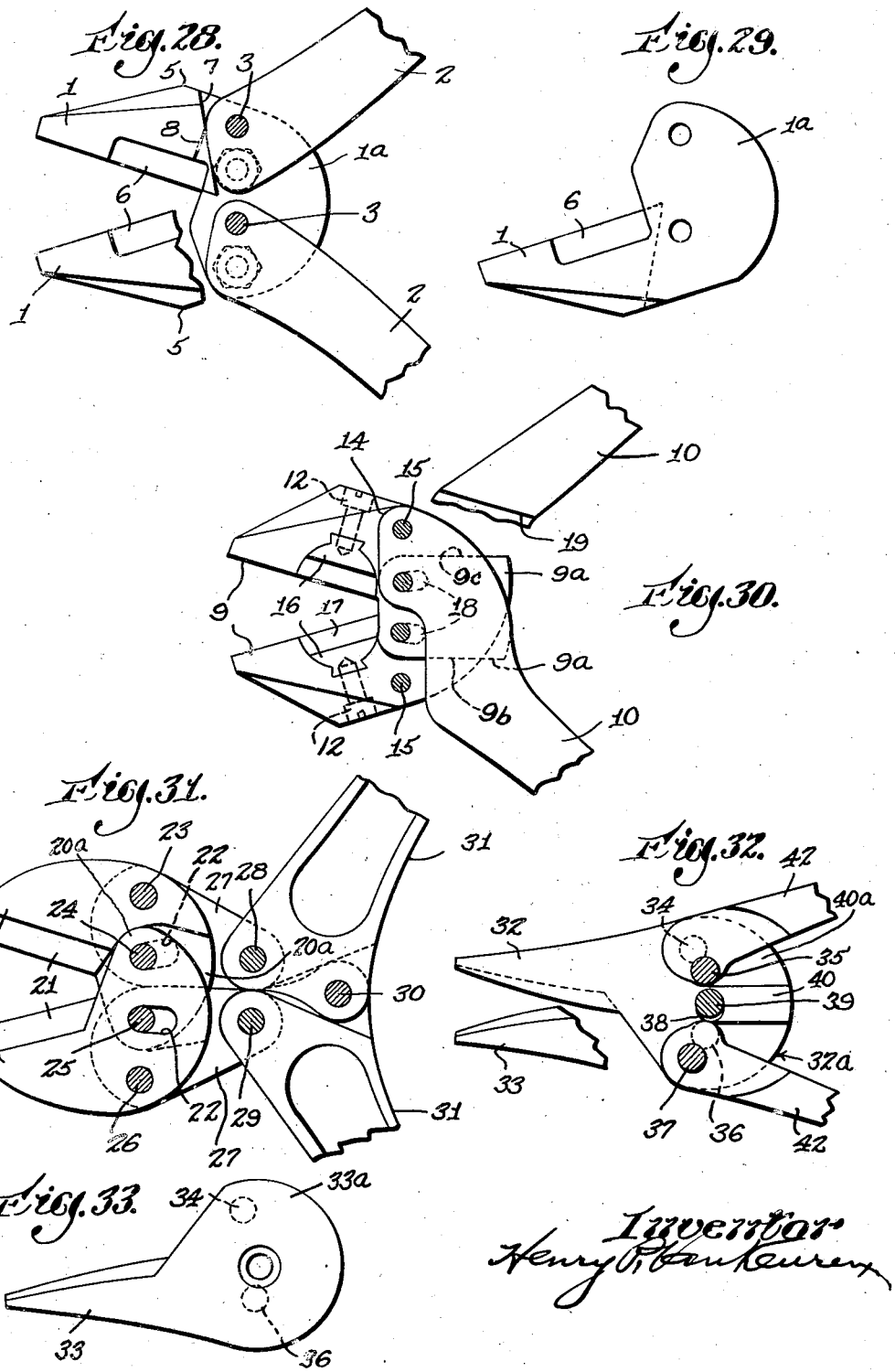

Patented Jan. 21, 1941

2,229,263

UNITED STATES PATENT OFFICE 2,229,263

HAND TOOL

Henry P. Van Keuren, Watertown, Mass.

Application June 26, 1937, Serial No. 150,555

13 Claims. (Cl. 81—46)

My invention relates to tools such as pliers, cutters, shears, etc.

The objects are increased power and utility and a construction that makes possible the application of maximum power at predetermined cutting or holding positions of the jaws;

The foregoing and other objects which will appear as the nature of the invention is better understood, may be accomplished by a construction, combination and operative arrangement of parts such as is disclosed by the drawings and specification. The nature of the invention is such as to render it susceptible to various changes and modifications, and, therefore, I am not to be limited to said disclosure; but am entitled to all such changes therefrom as fall within the scope of my claims.

In the drawings:

Figure 1 is a plan view and Figure 2 is a side elevational view of cutting pliers in open position. Figure 3 is a plan view, broken away, of said pliers in closed position. Figure 4 is a sectional view taken on the line 4—4 of Figure 3, and Figure 5 is a sectional view taken on the line 5—5 of Figure 1. Figure 6 is a diagrammatic view illustrating the respective positions of the pivoted pin members when said pliers are in closed and open positions respectively.

Figure 7 is a plan view of cutting pliers in closed position which are of somewhat different construction than those shown in Figure 1. Figure 8 is a similar view to Figure 7 partly broken away, of said pliers in open position. Figure 9 is a plan view and Figure 10 is a side elevational view of one of the jaw members of said pliers. Figure 11 is a sectional view taken on the line 11—11 of Figure 7. Figure 12 is a sectional view of a replaceable side cutting blade. Figure 13 is a sectional view taken on the line 13—13 of Figure 8. Figure 14 is a cross sectional view through a handle to illustrate its shape. Figure 14a is a diagrammatic view illustrating the respective positions of the pivoted pin members when said pliers are in closed and open positions respectively.

Figure 15 is a plan view of very powerful cutting tools of another construction, in closed position, and Figure 16 is a similar view, partly broken away of said cutting tools in open position. Figure 17 is a plan view and Figure 18 is an end view of one of the jaw members of said cutting tool. Figure 19 is a sectional view taken on the line 19—19 of Figure 16. Figure 20 is a diagrammatic view illustrating the respective positions of the four foremost pivotal pin members when said pliers are in closed and open positions respectively.

Figure 21 is a plan view of cutting shears or snippers in closed position, and Figure 22 is a side elevational view of them, and Figure 23 is a plan view, partly broken away, showing said shears in open position. Figure 24 is a sectional view taken on the line 24—24 of Figure 21. Figure 25 is a sectional view taken on the line 25—25 of Figure 21 and Figure 26 is a sectional view taken on the line 26—26 of Figure 21. Figure 27 is a diagrammatic view illustrating the respective positions of the pivotal pin members in said shears when said shears are in closed and open positions respectively.

Figure 28 is a plan sectional view of the pliers shown in Figure 3, partly broken away, with the rear extension portion of one jaw member not appearing, to better illustrate the construction and connecting means for the handles and jaw members, and Figure 29 is a plan view of said jaw member.

Figure 30 is a plan sectional view of the pliers shown in Figure 8, partly broken away, with the front end portion of one handle not appearing, to better illustrate the construction and connecting means for the handles and jaw members.

Figure 31 is a plan sectional view of the cutting tool shown in Figure 16, partly broken away, the top outer connecting links connecting the jaw members and handles not appearing, to better illustrate the construction and connecting means for the jaw members, handles and connecting links.

Figure 32 is a plan sectional view of the shears shown in Figure 23, partly broken away, the rear extension portion of one jaw member not appearing, to better illustrate the construction and means for connecting said jaw members and handles, and Figure 33 is a plan view of a said jaw member.

Figure 1:
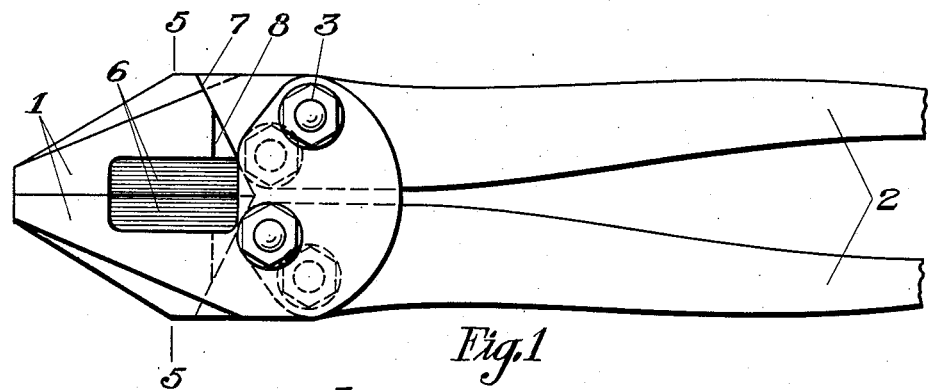
Figure 2:
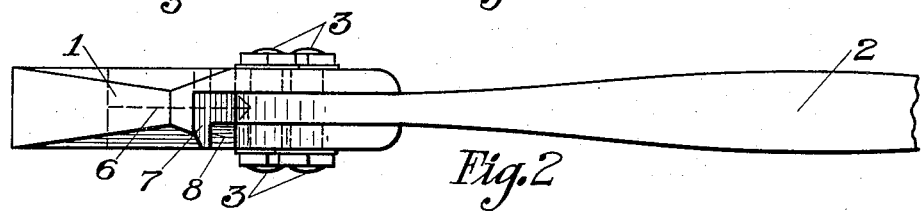
Figure 3:
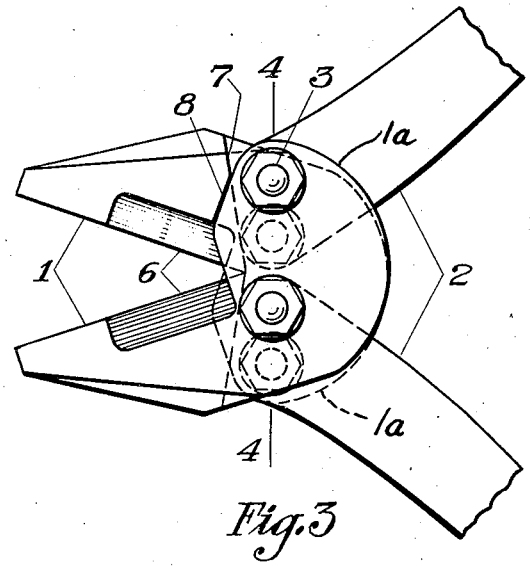
Figures 4, 5:
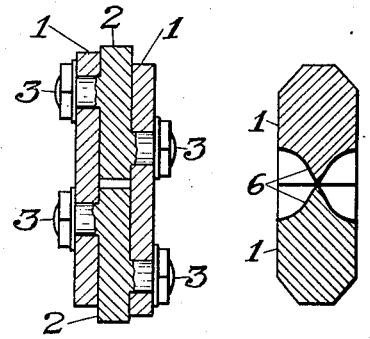

Referring to Figure 1, heavy, drop-forged, center-cutting pliers having a double, or compound, reversed, unequal toggle action are disclosed. The said action is so designed and laid out that when both jaws and handles are in the position of widest opening, the initial movement of the tool to closed position provides the greatest cutting or gripping power at the jaws due to a toggle action. There are two jaw members 1 which are identical, but reversed and opposed. They are extended and so formed rearwardly of cutters 6 that each provides an extension portion 1a extending across the longitudinal axis of the tool, which portions 1a embrace a pair of identical opposed handles 2 uncrossed, which are separate from said jaw members, which handles are between and in sliding contact with said extension portions 1a, as shown. In Fig. 4, studs, pins, or pivots 3 are shown as forged integrally with each handle 2 and each stud is provided with a nut. They movably connect a handle 2 to a jaw extension portion 1a as shown in Figure 28 of the drawings. In the closed position, said studs, pins, or pivots are arranged as shown in the left diagram of Fig. 6. From this diagram it can readily be seen that two unequal toggle (imaginary) lines are superimposed, one reversed on the other so as to have the outer two pivot or fulcral points in common. Each opposed handle 2 embodies two studs 3 which project on opposite sides of said handle and engage suitably located holes in the rear portion of opposed jaws so as to rotate one jaw one way and the other jaw the other way as the handles approach, or recede from, the center line of the tool. Said holes are so located in the rearwardly extending portion of each jaw that the center to center distance and their angular relationship determine or compose the long arm or line of each toggle.

Thus, it is seen that each opposed handle is integral with and composes a short arm of a pair of superimposed, reversed, unequal toggles while each opposed jaw is integral with and composes a long arm of the same pair of toggles. At every toggle position except dead center, or the position of infinite power coefficient, the long arms of the two toggles intersect and this point of intersection is the instantaneous center of jaw motion. No other center is necessary or provided.

The ratio between the length of the short toggle and the length of the long toggle arm is the ratio of angular movement between handle and jaw and the total angular motion is double that of the individual toggle.

Figure 6:
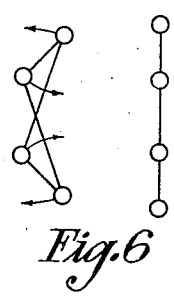

The right diagram of Fig. 6 shows the position of the fulcral points or studs 3 with jaws wide open. Both toggles have reached this position by motion of the studs in the direction of the arrows of the left diagram and by outward movement of plier handles 2. The toggles are "on center" and in a position to give maximum jaw pressure at the start of closing motion of the handles. It may thus be seen that the toggles are employed to the same purpose but in the opposite or reversed manner than is customary. It is immaterial, in so far as force magnitudes are concerned, whether toggles are pushed in at the center hinge points and produce compression in the arms—as is customary—or whether they are pulled out at the center with accompanying tension in the arms, as I so employ them here.

Another point to note is that each handle produces a rotating couple at its respective fulcral points or studs. The center about which this couple is applied is approximately on the center line of and midway between the studs. The handle leverage is then the ratio of approximately half the length of the short toggle arm to the length from said center to the point of application of the applied force, if considered as a bell-crank lever. This handle center is not fixed and its motion is influenced by the motion of the attached members.

The jaws open and close with a combined angular and translational motion occasioned by the difference in length between the outside, or common fulcral points when in the closed and open positions. There is a rocking motion to the cutting edges and when a piece is being cut it is also being moved in toward the center and leverages increased thereby. Stop surfaces 7 and 8 are provided to limit the opening movement of the handles and jaw members.

Referring now to Figure 7, again heavy cutting pliers are shown. They differ from those of Fig. 1 in details but not in principle. Jaws 9 are provided with inserted cutters 16 which are dove-tailed or keyed transversely into the jaws in addition to being located and locked therein by screws 12. In Fig. 11, which is a section on line 11—11 of Fig. 7, said cutters, jaws and screws are shown in transverse detail. It may be noted that center cutters 16 may be removed and replaced by the side cutters shown in Fig. 12. This construction permits either center or side cutters to be furnished on order, or for the user to easily replace damaged cutters or change from one type to the other at will. It further enables the manufacturer to use a very tough and strong alloy tool steel in the jaws, of a radically different heat treatment than is required at the cutters. Further, special shapes of cutters, special alloys, etc., can be furnished for special purposes. For instance, for cutting hardened or tempered spring wire, for drill rod, for hardened chain and the like, especially shaped cutters edged with special cutting materials such as stellite or cemented carbides—tungsten, titanium or tantalum—of extreme hardness, may be employed as indicated at 17. These edges of hard cutting material would in all probability be brazed to a tough and softer base, and are capable of resisting the high compressive stresses imposed at the cutters by the toggle actuated jaws. For normal usage however, cutters 16 and edges 17 would be one unit of alloy tool steel suitably hardened for all around purposes.

Handles 10 are of a hollow pressed steel construction, bead welded along the seam for rigidity. A typical section of a handle is shown in Fig. 14. At 19 the handles are forked or bifurcated so they may be reversed and cross each other. They engage the jaws on the outside thereof by means of bolts 15 which extend through jaws 9, handles 10 and reinforcing links 14 as shown in Fig. 13. Figures 9 and 10 show a jaw member in detail. It may be seen that slot 18 is provided in each jaw to allow for the motion of inner bolts 15.

The rear portion of each jaw member is formed as shown in Figures 9 and 10 to provide an extension portion 9a extending across the longitudinal axis of the tool and one said portion 9a slides upon the other within the range of motion which is stopped when the sloping edge 9b of one jaw bears against the milled edge 9c of the recess in the opposite jaw, as may be seen in Figures 7 and 8.

It is important to note that several functions of this type of pliers are different from the type shown in Fig. 1. First, translational movement of one jaw with respect to the other is such that a far wider throat is obtained at the inner ends of the cutting edges, permitting a larger diameter of rod or piece to be cut nearer to the dead center line of the toggles in the wide open position shown in Fig. 8. The reason for this is that by crossing the handles the toggles throw in the opposite direction from those of Fig. 1 and the instantaneous center travel is also in the opposite direction.

Further, all bolts are alike and extend transversely through the entire structure adding to the rigidity. Jaws may be made thinner and the weight of the tool considerably decreased thereby in view of the use of pressed steel handles.

Figure 15:
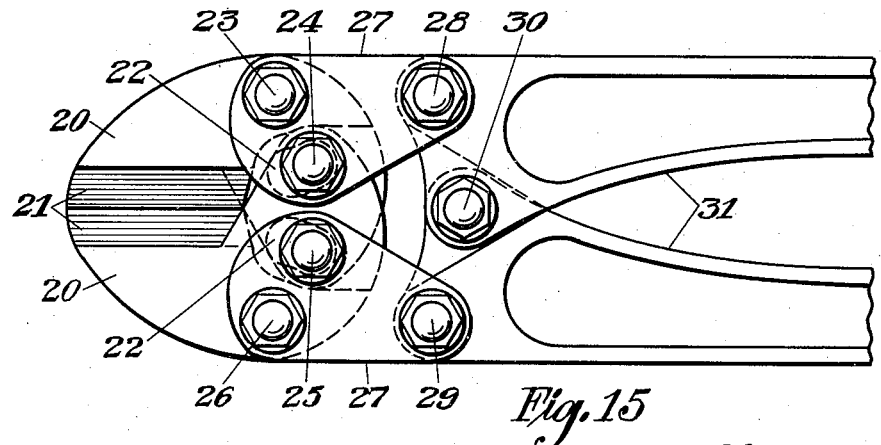
Figure 16:
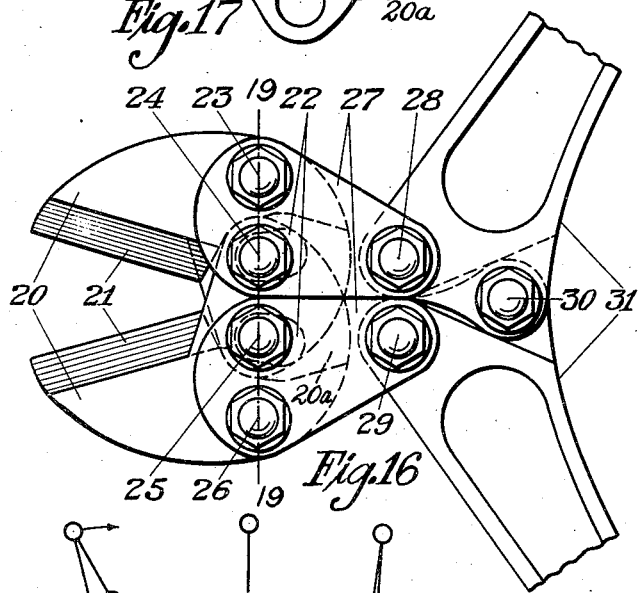
Figure 20:
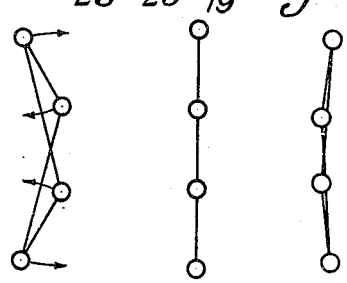

Fig. 15 shows a rod cutter or bolt clipper, as they are termed in the trade. Jaws 20, having cutting edges 21 are, in general, similar to jaws 9, Fig. 7, both in construction and in action having extension portions 20a each of which extend across the longitudinal axis of the tool. Bolts 23, 24 and 26 form, together with the secured members, one unequal toggle that is, the two toggle lines between said three bolts are unequal while bolts 26, 25 and 23 with opposite secured members form another but similar unequal toggle. The left diagram of Fig. 20 illustrates the toggles referred to and which I will term primary toggles. The arrows indicate the direction of motion of each bolt or pivot to arrive at the dead center toggle position shown by the center diagram of Fig. 20 and which corresponds to the wide open position of the jaws shown in Figure 16. At the right, Figure 20, is shown an optional position of the toggles with jaws wide open, which will be referred to later.

Links 27 are in the positions with respect to said jaw members as the handles 10 of Figure 7. Bolts 28 and 29 approach each other as the jaws open until said links are in contact along their inner edges, Figure 16, and provide a stop, with toggles on center. However, the toggles may be carried through center somewhat, see Figure 20, right, with no appreciable disadvantage and enable the jaws to dwell longer in the most powerful cutting position, if provided for in the design.

Handles 31 are hinged at 30 by a male and female joint and are also hinged to links 27 at bolts 28 and 29. Thus is formed a normal equal arm toggle 28—30—29 between the handles. This latter toggle operates normally to push apart links 27 during the latter part of the jaw motion in closing. During the first part of the jaw motion, in closing, another pair of toggles 23, 28, 30 and 26, 29, 30 operates in a reverse manner to rotate links 27 about their instantaneous centers which lie between bolts 23 and 24 also between bolts 26 and 25 respectively.

Thus I utilize primary or jaw toggles 23, 24, 26 and 26, 25, 23. I also utilize secondary or link-handle toggles 23, 28, 30 and 26, 29, 30. Further, I employ a tertiary handle toggle 28, 30, 29 which becomes most effective in action at the end of jaw closure.

To summarize, the primary or jaw toggles are in their most effective working position when both jaws and handles are wide open and the piece to be cut is in contact with cutters 21.

As the handles are pushed together the secondary or link toggles sustain the heavy cutting pressure over a considerable range of motion in spite of the fact that the effectiveness of both primary and secondary toggles is falling off. Finally the tertiary or handle toggle becomes effective as a normal toggle with increasing power until the jaws are closed.

In the design, the timing of the effectiveness of the several toggles may be varied through quite a range to suit specific conditions.

Figure 17:
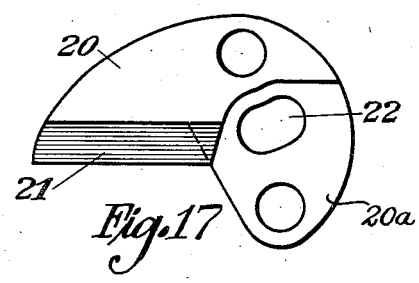
Figure 18:
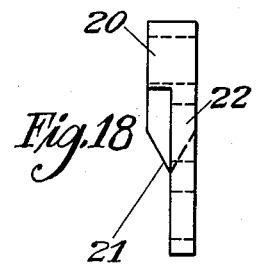
Figure 19:
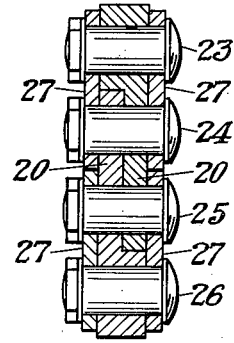

Figures 17 and 18 show details of jaws 20. Slot 22 is provided to accommodate the motion of bolts 24 and 25. Figure 19 is a section through all the primary toggle bolts when the jaws are wide open as in Figure 16.

The linkage of the above described rod or bar cutting tool gives a far more powerful cutting action at the jaws than any like tool of which I have knowledge. This linkage should also be of value in many other kinds of tools requiring a heavy jaw pressure, such as nippers, punches, riveters, formers of various kinds, sleeve tools for wire splicing, binders, sealers, seamers, shears, etc.

It may be noted that I need not confine this linkage to conditions requiring heaviest initial jaw pressure. I am able to compound the motions and time the toggles so as to give a maximum pressure at any predetermined point of the cutting or gripping stroke, as for instance, the quarter, third, half, etc., portion of the stroke, or even at approximately full stroke, to meet or suit any especially required condition.

In Figure 21 are shown heavy metal cutting shears or snips. These are designed for the mechanic's kit. They are light enough and of small size for easy portability, yet have sufficient power to cut the heaviest metals usually cut by the largest hand shears. They are of the so-called French nose type and adapted to cut around curves of small radii.

In shearing or cutting metal with shears of any type, the cut progresses as the material is sheared. In hand shears the cut usually starts well back toward the center of the jaws—where the leverage is greatest—and progresses toward the ends of the blades with a rapid decrease of power due to a corresponding increase in the moment arm of the resistance while the moment arm of the applied forces at the handle remains fairly constant. In heavy stock, a stalling point is usually reached after a short cut, then another "bite" has to be taken.

The shears shown here are designed to, in part, overcome this characteristic of single pivot shears and provide a means of increasing the leverage as the cut progresses toward the ends of the blades.

This is accomplished by locating the pivotal points as previously described—except that the toggle or pivotal points are so located as to be in a dead center position when the blades are practically closed. This is opposite to my application of the double toggle principle in the pliers before described. It is important to note, however, that the toggles may be employed in pliers in the same manner as in these shears. Also the maximum cutting force in either pliers or shears may be timed to occur at any given point—as is set forth in the case of the bolt or rod cutters.

Referring to Figure 21, jaw members or blades 32 and 33 each have an extension portion 32a and 33a and are operated by handles 42 connected by means of studs 34, 35, 36, 37. The upper handle carries studs 34, 35, integral therewith, and the lower handle, studs 36 and 37, as shown in Figure 25. The said studs engage blind holes in the jaws, as shown, and are adapted to cause the blades to open and close with a like but much greater movement of the handles. Figure 27 shows, in the left diagram, the position of toggle points when the jaws are closed and in the right diagram, the position of the same points when the jaws are open. The arrows in the latter diagram indicate the direction of motion of the studs in moving from the open to the closed position.

A center bolt 39 holds blades and handles together in proper sliding fit. Bolt 39 is not a center of motion and has nothing to do with such a center. Said center of motion is a movable instantaneous center located where the two long toggle arms intersect as shown in Figure 27 of the drawings.

Since blades or jaws 32 and 33 both slide as well as rotate, the one on the other, the hole for center bolt 39 must necessarily be slotted in one blade at least, as is shown by slot 38 in blade 32, and may be slotted in both blades so that the motion of bolt with respect to slot is cut in half and both blades are then identical. Said bolt 39 is preferably located approximately as shown, where the motion of translation is least—as determined from layout or model. It may however be located ahead of the toggles and nearer the shearing edges but the slot will necessarily be longer. Each said jaw member 32 and 33 has a bearing surface 40 on said extension portions 32a and 33a, on each side of which are recesses 40a to permit a sliding movement of said handles 42. Stop members 41 are provided on said handles 42 to terminate the closing movement at a predetermined point.

Inasmuch as the cutting power of my tools depends upon movement of the jaws which are movably held in opposed relationship and are connected to handles or other elements at fulcral points by the various pin members or studs, the locations of said pin members in the various positions of said jaws should be noted, and I have illustrated in detail various positions in the different tools of the said pin members when the jaws are open and when they are closed. For instance, it will be observed that in some of the views the tools are shown with said pin members in different planes longitudinally of the tool during all positions and movements thereof, which positions are such that it is possible to develop great cutting power with said tools.

In some of the drawings the two outside pin members (the ones farthest laterally from the longitudinal axis of the tool) are shown in different transverse planes than the inside members during a movement of the jaws, while said two pin members are in different longitudinal planes during all movements thereof.

To preserve alinement of the cutting edges and to help endure the heavy side strains imposed on the jaws by cutting action I find it desirable to have said pin members extend transversely completely through the tool, as shown in Figure 13 of the drawings, for instance.

It will be noted in some of the views that the two holes in a jaw member are spaced a substantial distance apart and considerably further than the space between two of said pin members on the same side of the longitudinal axis of the tool. With this arrangement great cutting power of the tool is made possible.

In some instances two of the pin members are nearer the tips of the jaw members and the other two members are farther apart laterally when the jaw members are closed than when they are open, such as illustrated in Figures 1–6 of the drawings, which provide conditions in which great power in the jaws of the tool during movement can be attained.

Having thus set forth and described some of the applications and developments of my invention, I claim:

1. A tool comprising two jaw members opposed to each other, each said jaw member embodying a portion extended laterally from the longitudinal axis of said tool to the other side thereof whereby said portions overlap each other laterally, two elements separate from and adapted to actuate said jaw members, means movably connecting said jaw members and elements embodying four connecting members, two of said connecting members connecting said elements to said extended portions, the other two of said connecting members connecting said elements to said jaw members at points other than at said extended portions the relative positions of said jaw members and elements being such that two of said four connecting members in one position of said elements and jaw members are in a different transverse plane across the tool than said other two, and in another and opposite position of said elements and jaw members said four connecting members are in substantial alinement with each other in a direction extending across said tool.

2. A tool comprising two handles, two opposed jaw members separate from said handles, an end portion of one handle extended across an end portion of the other handle adjacent said jaw members, each said jaw member embodying a portion extended laterally from the longitudinal axis of said tool in a direction opposite to the direction in which the similar portion of the other jaw member extends, and means pivotally connecting said handles and jaw members embodying a plurality of members connecting the said handles and jaw members, two of said members connecting said jaw members and said handles and each engaging the non-laterally extending portion of a said jaw and a said handle and the laterally extending portion of another said jaw and two other of said members connecting said jaw members and said handles at portions thereof other than at said jaw extended portions.

3. A tool comprising two handles, two opposed jaw members separate from said handles, a plurality of links between said handles and jaw members, each said jaw member embodying a rearward portion extended laterally from the longitudinal axis of said tool to the other side thereof, and means pivotally connecting said handles, jaw members and links, said means embodying a member movably connecting said handles together, two members movably connecting said handles and links, and a plurality of members movably connecting said links and jaw members, two of said plurality of members movably connecting said extended portions to said link members and two of said plurality of members connecting said link members to portions of said jaw members that are at one side of and are not extended across said axis.

4. A tool comprising two handles, two opposed jaw members separate from said handles, a plurality of links between said handles and jaw members, two of said links being on one side of the longitudinal axis of said tool and two being on the other side of said axis, each said jaw member embodying a rearward portion extended from the main portion of each said jaw member at one side of said tool laterally from the longitudinal axis of said tool to the other side thereof, and means pivotally connecting said handles, jaw members and links, said means embodying a pin member movably connecting said handles together, two pin members movably connecting said handles and links, and four pin members movably connecting said links and jaw members, two of said four pin members movably connecting said extended portions to the two said link members which are on the same side of said axis as said extended portions, and two of said four pin members movably connecting said jaw member main portions to the two said link members which are on the same side of said axis as said jaw member main portions.

5. A tool comprising two jaw members opposed to each other, two elements separate from and adapted to actuate said jaw members, and means pivotally connecting said jaw members and elements, said means being positioned laterally of the longitudinal axis of said tool and including four pivoting members, two of said members being on opposite sides of and farther from the longitudinal axis of said tool than the other said two members, the other two said members during a movement of said elements and jaw members being in different planes transversely of said tool than the first-mentioned two members, said four members being in different planes longitudinally of said tool during all movements thereof.

6. A tool comprising two jaw members opposed to each other, two elements in uncrossed position relative to each other and separate from and adapted to actuate said jaw members, and means pivotally connecting said jaw members and elements, said means being positioned laterally of the longitudinal axis of said tool including four pivoting members, two of said members being on opposite sides of and farther from the longitudinal axis of said tool than the other said two members, the other two said members during a movement of said elements and jaw members being in different planes transversely of said tool than the first-mentioned two members, said four members being in different planes longitudinally of said tool during all movements thereof.

7. A tool comprising two jaw members opposed to each other, two elements crossing each other at one end thereof and separate from and adapted to actuate said jaw members, and means pivotally connecting said jaw members and elements, said means being positioned laterally of the longitudinal axis of said tool including four pivoting members, two of said members being on opposite sides of and farther from the longitudinal axis of said tool than the other said two members, the other two said members during a movement of said elements and jaw members being in different planes transversely of said tool than the first-mentioned two members, said four members being in different planes longitudinally of said tool during all movements thereof.

8. A tool comprising two opposed jaw members, each said jaw member embodying a portion extending laterally from the longitudinal axis of said tool to the other side thereof whereby said portions overlap each other laterally, two elements separate from said jaw members, means movably connecting said jaw members and elements whereby said elements are adapted to actuate said jaw members, said means embodying four members one member of which movably connects a said jaw member extended portion to a said element at a point laterally of said longitudinal axis and another member of which movably connects the other said jaw member extended portion to the other said element at a point laterally of said longitudinal axis, and another member of which connects a said jaw member to a said element at a point other than at said extended portion and another member of which connects the other said jaw member to the other said element at a point other than at said extended portion, said four members being in different planes longitudinally of said tool during all positions and movements thereof.

9. A tool comprising two opposed jaw members, each said jaw member embodying a portion extending laterally from the longitudinal axis of said tool to the other side thereof whereby said portions overlap each other laterally, two elements separate from said jaw members, means movably connecting said jaw members and elements whereby said elements are adapted to actuate said jaw members, said means embodying four members one member of which movably connects a said jaw member extended portion to a said element at a point laterally of said longitudinal axis and another member of which movably connects the other said jaw member extended portion to the other said element at a point laterally of said longitudinal axis, and another member of which connects a said jaw member to a said element at a point other than at said extended portion and another member of which connects the other said jaw member to the other said element at a point other than at said extended portion, said four members being in different planes longitudinally of said tool during all positions and movements thereof and each extending transversely completely through said tool.

10. A tool comprising two opposed jaw members, each said jaw member embodying a main portion and a side portion extending therefrom laterally from the longitudinal axis of said tool to the other side thereof, each said main portion and side portion having a hole therein, two elements separate from said jaw members each embodying two holes therein so positioned that said holes in said elements are in alinement with said holes in said jaw members when said elements and jaw members are operably assembled together, four pin members spaced apart and extending through said holes in said jaw members and said elements to thereby pivotally hold them together, each of said pin members being in a different plane, longitudinally of said tool, the space laterally between two of said pin members on the same side of said axis being less than the space laterally between two said holes in a said jaw member when said elements and jaw members are operably assembled together.

11. A tool comprising two opposed jaw members, each said jaw member embodying a main portion and a side portion extending therefrom laterally from the longitudinal axis of said tool to the other side thereof, each said main portion and side portion having a hole therein at opposite sides of said axis, two elements separate from said jaw members each embodying two holes therein so positioned that said holes in said elements are in alinement with said holes in said jaw members when said elements and jaw members are operably assembled together, a separate pin member movably and separately holding together a said jaw member main portion and a said jaw member side portion and a said handle, and another separate pin member movably and separately holding together the latter-mentioned jaw member main portion to the latter-mentioned handle, another separate pin member movably and separately holding together the other said jaw member main portion and the other said jaw member side portion and the other said handle, and another separate pin member movably and separately holding together said other said jaw member main portion to the said other handle.

12. A tool comprising two opposed jaw members, each said jaw member embodying a main portion and a side portion extending therefrom laterally from the longitudinal axis of said tool to the other side thereof, each said main portion and side portion having a hole therein at opposite sides of said axis, two elements separate from said jaw members each embodying two holes therein so positioned that said holes in said elements are in alinement with said holes in said jaw members when said elements and jaw members are operably assembled together, a separate pin member movably and separately holding together a said jaw member main portion and a said jaw member side portion and a said handle, and another separate pin member movably and separately holding together the latter-mentioned jaw member main portion to the latter-mentioned handle, another separate pin member movably and separately holding together the other said jaw member main portion and the other said jaw member side portion and the other said handle, and another separate pin member movably and separately holding together said other said jaw member main portion to the said other handle, all of said pin members extending transversely completely through said tool.

13. A tool comprising two opposed jaw members, each said jaw member embodying a portion extending laterally from the longitudinal axis of said tool to the other side thereof whereby said portions overlap each other laterally, two handles separate from said jaw members, means movably connecting said jaw members and handles whereby said handles are adapted to actuate said jaw members, said means embodying four pin members one member of which movably connects a said jaw member extended portion to a said handle at a point laterally of said longitudinal axis and another member of which movably connects the other said jaw member extended portion to the other said handle at a point laterally of said longitudinal axis, and another member of which connects a said jaw member to a said handle at a point other than at said extended portion and another member of which connects the other said jaw member to the other said handle at a point other than at said extended portion, the relative positions of said handles and jaw members being such that two of said pin members are nearer the tips of said jaw members and the other two said pin members are farther apart laterally from each other when said jaw members are closed than when they are open.

HENRY P. VAN KEUREN.